(12) United States Patent
    Hinks

(10) Patent No.: US 9,285,005 B2
(45) Date of Patent: Mar. 15, 2016

(54) NEGATIVE SPRING COMPENSATION FOR ELASTOMERIC BEARING TORQUE

(71) Applicant: William Lloyd Hinks, Akron, OH (US)

(72) Inventor: William Lloyd Hinks, Akron, OH (US)

( * ) Notice: Subject to any disclaimer, the term of this patent is extended or adjusted under 35 U.S.C. 154(b) by 164 days.

(21) Appl. No.: 13/804,100

(22) Filed: Mar. 14, 2013

(65) Prior Publication Data
    US 2014/0265077 A1      Sep. 18, 2014

(51) Int. Cl.
    *F16F 15/06*     (2006.01)
    *F16F 3/10*      (2006.01)

(52) U.S. Cl.
    CPC ............. *F16F 3/10* (2013.01); *F16F 2228/063* (2013.01)

(58) Field of Classification Search
    CPC ........... F16F 15/02; F16F 15/04; F16F 15/06; F16F 15/046; F16F 15/073; F16F 2228/063
    USPC ............. 267/136, 140.2–140.4, 141.1–141.4; 248/619, 621; 52/167.1–167.8
    See application file for complete search history.

(56) References Cited

U.S. PATENT DOCUMENTS

| | | | | |
|---|---|---|---|---|
| 3,144,228 A | * | 8/1964 | Kass | 248/633 |
| 3,268,199 A | * | 8/1966 | Kordyban et al. | 220/632 |
| 3,434,708 A | * | 3/1969 | Hawk, Jr. | 267/293 |
| 5,018,701 A | * | 5/1991 | Morikawa et al. | 248/631 |
| 5,102,107 A | * | 4/1992 | Simon et al. | 267/152 |
| 5,178,357 A | * | 1/1993 | Platus | 248/619 |
| 5,310,157 A | * | 5/1994 | Platus | 248/619 |
| 5,366,324 A | * | 11/1994 | Arlt et al. | 405/195.1 |
| 5,370,352 A | * | 12/1994 | Platus | 248/619 |
| 5,478,058 A | * | 12/1995 | Tucchio et al. | 267/136 |

* cited by examiner

*Primary Examiner* — Christopher Schwartz

(57) ABSTRACT

Elastomeric bearings exhibit a reactive positive spring effect, i.e., they produce an opposing torque or force when angular displacement or translation is applied upon them, due to shear stress developed within their elastomer parts. The present invention incorporates a device that exhibits an increasingly strong torque or force in the same direction as the displacement, i.e., a negative spring, under similar conditions of movement. When properly calibrated, the subject type of device can be used in paralleled motion with the ordinary reactive elastomeric bearing to produce a combined effect in which at least a part of the torque or force of the elastomeric bearing is changed or minimized over a range of movement.

20 Claims, 8 Drawing Sheets

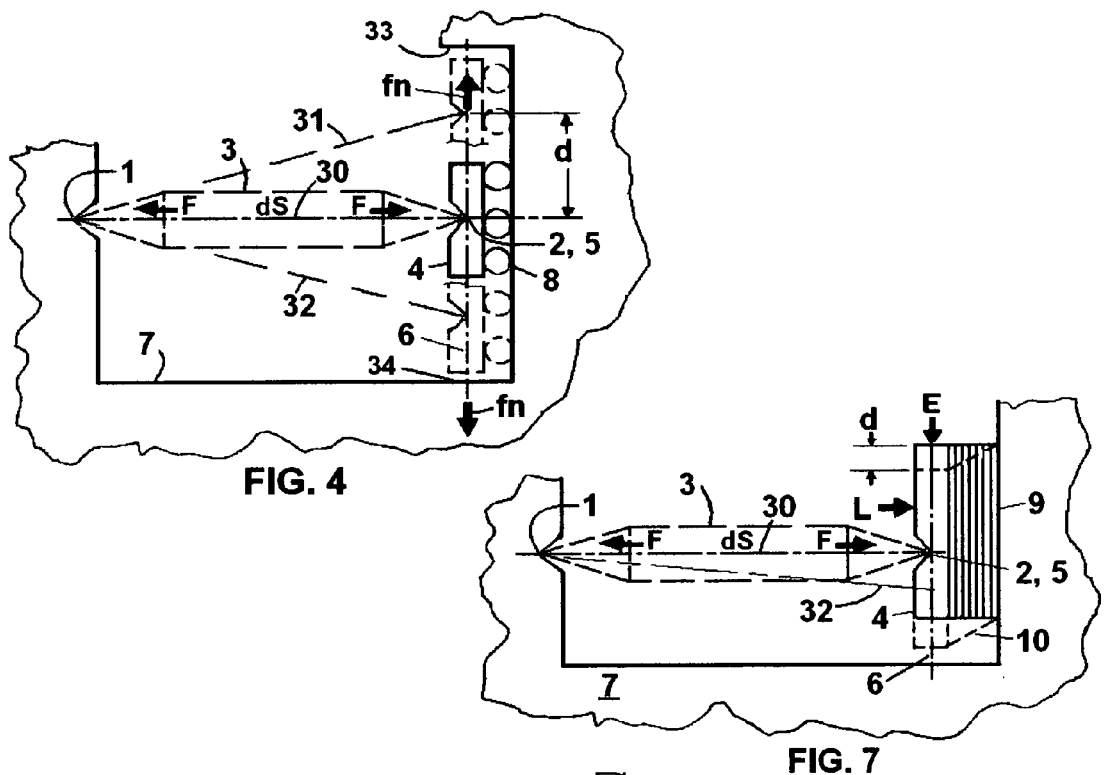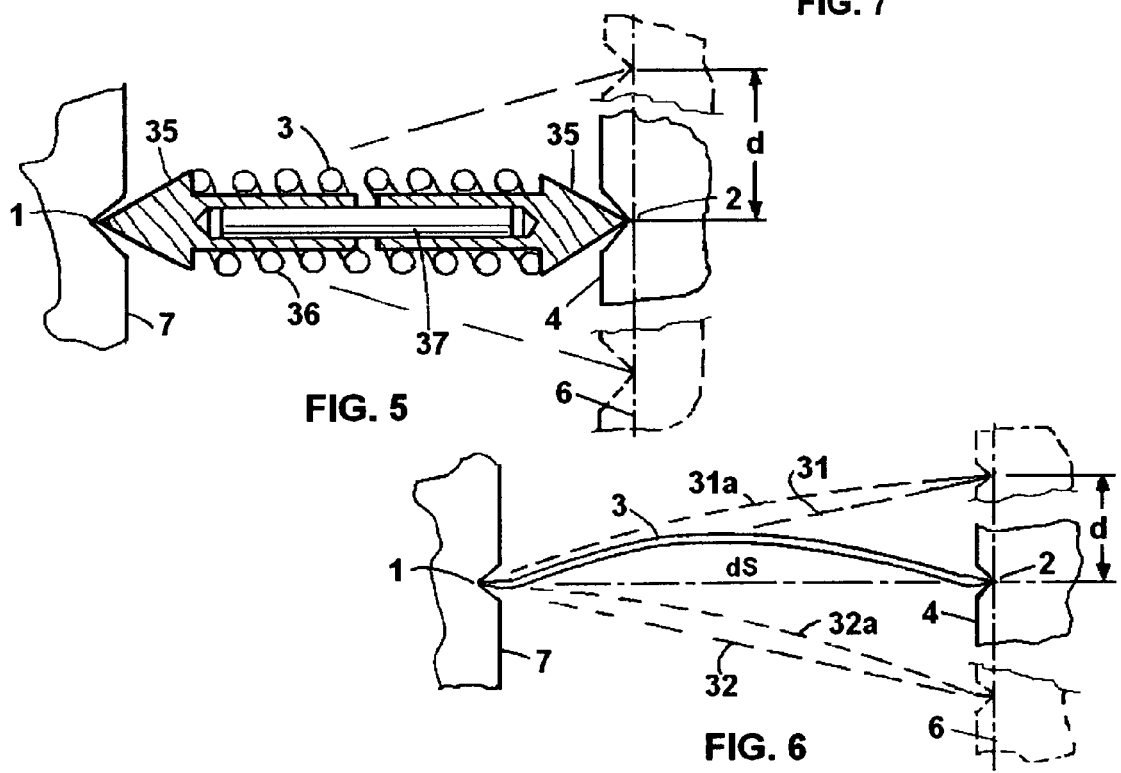

NEGATIVE SPRING COMPENSATION FOR ELASTOMERIC BEARING TORQUE

BACKGROUND OF THE INVENTION

The field of the invention relates to rubber or elastomeric bearings (including laminated rubber bearings) used to support limited-movement between opposing loading members, all of which develop torques or forces more or less proportional to the extent of movement between the opposing members over a range, essentially an elastomeric spring effect. In some cases, the torques or forces required may exceed those ordinarily available, as exerted by humans for instance, and powered boosters have been necessary to achieve the desired extent of movement.

The following United States of America Patents are cited as references:

| | |
|---|---|
| 2,900,182 | Hinks |
| 3,228,673 | Hinks |
| 3,532,174 | Diamantides et al |
| 3,734,546 | Herbert, et al |
| 3,504,902 | Irwin |
| 6,524,007 | Hinks |
| 6,834,998 | Hinks |
| 5,794,753 | Kemper |
| 5,887,691 | Kemper |
| 5,967,283 | Kemper |
| 5,984,071 | Kemper |
| 4,607,382 | Dijkstra |
| 4,722,517 | Dijkstra |
| 5,178,357 | Platus |
| 5,310,157 | Platus |
| 5,390,892 | Platus |
| 5,669,594 | Platus |

The following Canadian Patent is a further reference:

| | |
|---|---|
| 731007 | Ballauer |

In the prior art, elastomeric bearings as disclosed in U.S. Pat. Nos. 2,900,182 and 3,228,673 include at least one, but usually multiple alternate laminations of metal or other strong inextensible material and rubber or elastomer usually bonded together. Lateral motions between succeeding metal laminations are permitted by shear strain within and parallel to the intervening rubber laminations. They can be made with layers in any shape, with apertures or not, and with various cross-sectional configurations, including truncated planar, conical, spherical, chevron-shaped or cylindrical layers.

All elastomeric bearings are used to separate and support opposed relatively moveable external loading members that bear upon the outer load-accepting layers or end pieces of the bearings that have load faces and are generally made of thicker metal. The opposing outer layers may be shaped to conform with and to seal with respect to their respective complemental loading members and to provide for keying to the latter for orientation and prevention of relative slipping.

When the external load faces of such a bearing are interposed between such complementally-contoured and opposed loading members, it can resist thrust, radial or combined forces normal to its layers, depending upon its configuration. Relative lateral movement between the opposed loading members, which may include pivoting about a normal axis as well as transverse or lateral shifting, results in a distribution of shearing movements between individual rubber layers.

An additional property of such a load-bearing bonded laminate stack that contains one or more apertures is the capability of preventing the lateral or transverse flow of fluids, i.e., liquids or gases, between the periphery of the laminate stack and an aperture, and making them essentially impervious even under substantial differential pressure. I.e., the space occupied by the bulk of the laminations between the opposing members is blocked against fluid penetration. U.S. Pat. Nos. 3,532,174, 3,734,546, 3,504,902, 6,524,007 and 6,834,998 exhibit the concept of rubber laminated bearings that seal against fluid flow, referred to here as bearing-seals. This sealing property is nevertheless irrelevant to the current invention.

As indicated above, elastomeric bearings and bearing-seals usually have the primary purpose of supporting loads and/or sealing between opposing members while permitting limited motion between said members, whether rotational or translational. Since that motion is the cumulative result of shear strain in the layers of elastomer itself, these devices usually develop negligible coulomb friction, but do exhibit an increasing resistive or reactive force or torque due to shear stress in the elastomer layers that accompanies the motion. This essentially linear spring effect can be described over the effective range by a number representing the rate of change of reactive force or torque acting against the displacement, i.e., its translational or torsional stiffness, i.e., spring rate.

In some cases, this stiffness is negligible in comparison to the forces or torques available to overcome them, and in others, it is a desirable effect. However, in situations where the high reaction forces or torques of elastomeric bearings exceed those of the means readily available to counteract them, those means have often been replaced, amplified, or supplemented by power booster means, which may be complex, expensive, unreliable, and weighty or otherwise undesirable.

This has often been particularly true for helicopter control systems. Laminated elastomeric bearings have frequently been made part of helicopter rotor hubs to retain each of the rotor blades against very high centrifugal forces while permitting their blade pitch, i.e., feathering, angles to be changed for control purposes. But except for small helicopters, it has been found that the forces required to change the pitch of the elastomeric-retained blades generally exceeds those available through human actuation of the pitch control sticks alone, and hydraulic boosters have conventionally been used to relieve the pilot from high control stick forces.

A similar situation, in principle, was faced by Kemper (U.S. Pat. No. 5,794,753, etc.) in a problem associated with the human-operated clutch of heavy trucks and other machinery. But rather than rely on conventional externally-powered actuators to help operate the clutch, he describes systems involving passive Bellville springs to accomplish that purpose. Bellville springs possess a non-linear force-displacement behavior that includes a region in which extended motion causes not a proportionally resisting force, but instead a force in the same direction and increasing with the motion. This is in effect defines a negative spring rate region of their force-displacement characteristic. Thus the Bellville spring's proportionally increasing force to separate the clutch plates helps the human act against the clutch springs that clamp the rotating clutch plates together.

Dijkstra (U.S. Pat. Nos. 4,607,382 and 4,722,517) and others referenced therein employ negative spring means to reduce the effective stiffness of loudspeaker cones and thereby lower their natural frequency.

Platus (U.S. Pat. No. 5,178,357, etc.) describes vibration-isolation platforms that employ a relatively stiff spring to support the weight of a mass placed upon the platform, together with negative spring means acting in parallel to reduce the effective local stiffness of the combined springs. This reduces the resonant frequency of the suspended spring-mass system so that results of higher frequency test vibrations applied to the mass are essentially unaffected by the suspension system.

Besides the inventions of Kemper, Dijkstra and Platus, many common extant devices employ elements that produce some characteristics of negative springs through involvement of sources of pushing or pulling forces. These force sources include passive springs of various kinds, such as coil, leaf, Bellville and Neg'ator springs, used in either tension or compression, and actuators powered by hydraulics, pneumatics, or electromagnetics, etc. The common quality of all these negative spring devices is that, with respect to some "center" position, they all exhibit a characteristic torque or force versus deflection behavior of urging movement farther away from the center over a range when initially deflected away from it, i.e., they exhibit a binary instability or "over-center" effect.

For instance, the common "snap-action" electrical switch, having many variations, often uses a pivoted compression spring that tends to force the associated contact assembly into one of two stable positions, either the "ON" or "OFF" state. When the spring is moved by a switch handle through its tightly compressed center position and goes over-center, the force of the spring on the contact assembly changes direction abruptly and causes it to quickly change states. A motion away from center causes a component of force to develop urging further movement in the same direction away from center. But in this case, there is no attempt to use this repelling effect to quantitatively compensate any positive spring continuously over a range of motion, but only to cause motion of the contact assembly as far as it will go in either direction.

On the other hand, Kemper and Dijkstra and Platus do calibrate their negative spring functionalities against the primary positive spring effects of their devices. Of these inventors, the first apparently uses the over-center effect only on one side of the force-centered position, while the others' apparatus operates on both sides of center.

SUMMARY OF THE INVENTION

The purpose of the invention is to provide a simple, passive, inexpensive, and lightweight means of overcoming undesirable high stiffness characteristics of elastomeric bearings and/or seals, whether they are rotational or translational types, responding respectively to applied torques or forces. This purpose applies especially for helicopters, Much of the following description applies to both types whether the term "torque" or "force" is used.

Although elastomeric bearings are the focus of discussion throughout this disclosure, there exist other mechanisms that also exhibit the kind of springlike characteristics that elastomeric bearings have. These include so-called tension-torsion straps as used to retain helicopter rotor blades, and certain metallic joints (e.g., C-Flex), both of which have torsional spring properties. Most of the following discussion and claims are applicable to these types of bearing and support devices as well.

In brief, the invention involves the association of negative spring means together with elastomeric bearings and/or seals so that said negative spring means experience at least part of the same or proportional motion as, and produce a combined result of reducing the positive reaction torques of, said elastomeric bearings and/or seals. To accomplish these results, the negative spring means must exhibit a torque or force that acts in the direction away from a zero force center position, i.e., as if repelled from said center position. This is an essentially linear effect that can be described over its effective range by a negative number representing the rate of change of the negative spring means' force or torque with deflection. In some cases this negative rate would numerically be equal in magnitude as well as opposite in sense to the positive rate of the elastomeric spring effect, thereby canceling it and rendering the overall change of force or torque negligible over a range of motion.

It is an object of the invention to employ negative spring means to reduce or modify the force or torque required to operate elastomeric bearings and/or seals through at least part of their movement regime.

BRIEF DESCRIPTION OF THE DRAWINGS

FIG. 4 schematically represents a simple type of mechanism including pushing means that functions as a negative spring according to the invention.

FIGS. 5 and 6 show details of two types of compression springs that could be used for a force source.

FIG. 7 shows a negative spring device similar to FIG. 4 used to directly cancel lateral spring forces developed by a translational elastomeric bearing according to the invention.

DETAILED DESCRIPTION OF THE INVENTION

Figure 1:
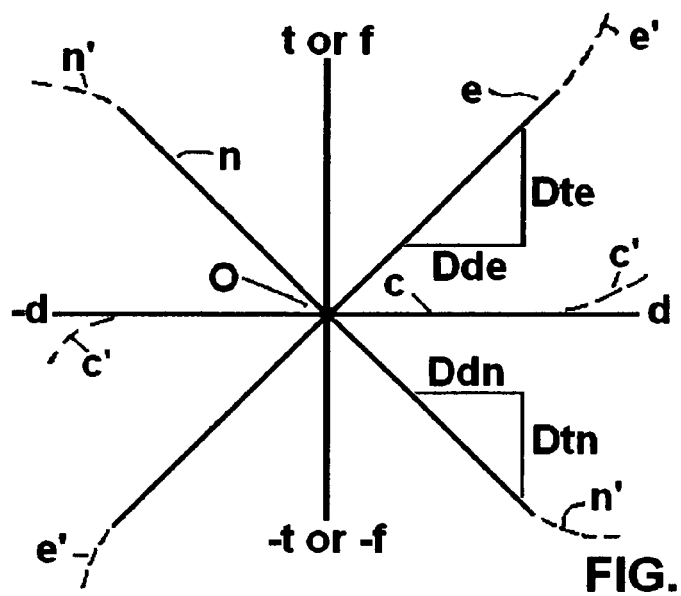
FIGS. 1, 2 and 3 are graphs showing force or torque vs. deflection curves of elastomeric bearings and negative springs according to the invention.

FIG. 1 illustrates the theoretical force or torque vs. deflection curves of elastomeric bearings, negative springs, and the combined result of these opposing torques or forces at any given deflection. The horizontal axis represents the angular or lineal deflection d, negative at the left and positive at right relative to zero deflection at the center, while the vertical axis represents units of torque t or force f, positive up and negative down relative to the central zero.

The point of zero deflection and zero torque (or force) represents the relaxed, untorqued state of the elastomeric bearing (conveniently placed at the origin O of the plot), and the straight line e through this point is the idealized torque response of the bearing as it is rotated through a deflection angle d. It has the positive slope Se (i.e., a positive spring rate or stiffness), meaning that the torque developed opposes the direction of deflection, as if to restore it back to the zero position. In the form of an equation Se=Dte/Dde, where Dte=change of elastomeric torque and Dde=change of deflection of the elastomeric spring. This torque response is idealized as a straight line, although the real bearing will generally deviate substantially from linearity at large values of deflection as the elastomer reaches the limits of its resilience and generally becomes stiffer, as indicated by the dashed lines labeled e'.

Similarly, an ideal t vs. d plot of the negative spring labeled n is seen, depicting a force or torque equal and opposite to that of the elastomeric spring for every value of deflection, i.e., this torque acts in the same direction as the deflection, so as to aid it. The straight line slope Sn (i.e., negative spring rate) is represented by the equation Sn=Dtn/Ddn, where Dtn=change of negative spring torque and Ddn=change of negative spring deflection. By definition, Sn=−Se, Of course, this curve will likely deviate somewhat from linearity also, particularly near the limits of its working range as indicated by the dashed lines labeled n'.

In this ideal case the negative spring torque (force) exactly cancels the elastomer torque at every point, and the resulting combined force or torque is exactly zero for all deflections in the linear range. Hence, the combined t vs. d curve lies on the horizontal axis, labeled c. The dashed deviation lines labeled c' represent the combined actual deviations from true cancellation at the limits of the range of deflection. Under these conditions and within the effective range, there would theoretically be little or no steady force exerted by a helicopter pilot on his control stick, and it would remain in place if he released it from his hand.

The case of exact cancellation shown in FIG. 1 requires both the elastomeric bearing and the negative spring means to have identical absolute spring rates (though in the opposite sense) and for both to have their center locations (deflections with zero force) aligned. That situation may not be the case, either by inexact compensation or by design.

Figure 2:
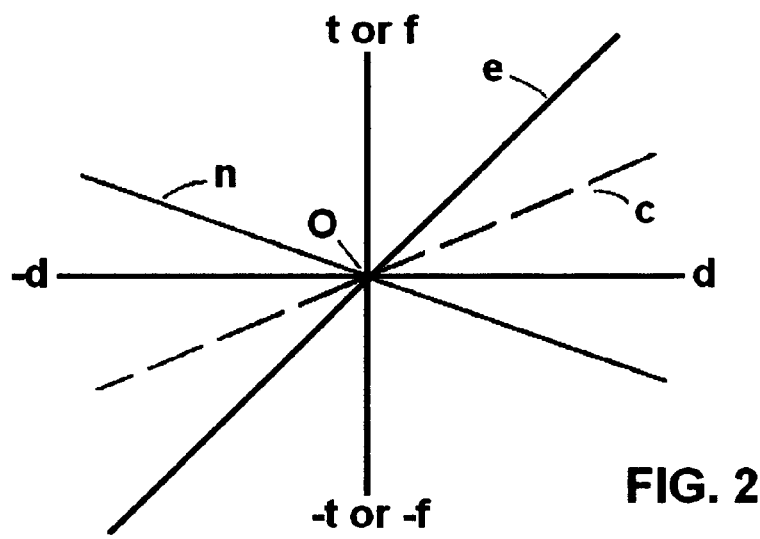
Figure 3:
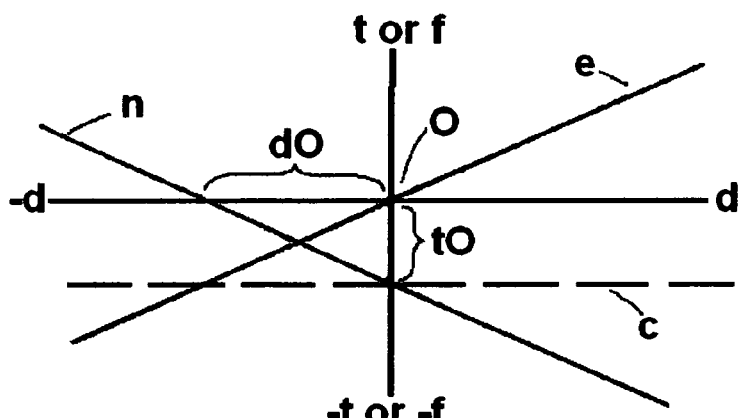

FIG. 2 is another example of an ideal t vs. d plot of the positive and negative springs over their active range with the same designations. The elastomer spring and negative spring plots are again arbitrarily assumed to have torque centers that coincide at a point, which is taken to be the origin of the graph as in FIG. 1. However, the negative slope is smaller in absolute magnitude than the positive spring slope. The combined plot (obtained by subtracting the torque magnitude of the negative spring from the positive torque at all deflections) is seen by the dashed line to exhibit a smaller spring rate c (i.e., less stiff) than the original elastomeric bearing stiffness. This might have a desirable effect of making human control forces manageable while still causing a control stick to revert to the neutral center position with hands off. There may be applications where making the negative spring stronger, with the attendant binary instability would be beneficial, FIG. 3 is yet another example. The elastomeric spring plot is assumed to have its torque center at the origin of the graph, but the torque center of the negative spring is offset by the distance labeled dO, while the negative slope has the same absolute magnitude as the positive spring slope or spring rate. The combined plot is seen to be a constant small torque tO in one direction, depending upon the relative registration or locations of the force centers. It can be seen that numerically, $$tO=dO*Sn.$$

In general, combinations of the conditions of FIGS. 2 and 3 may have benefits in various applications of elastomeric bearings.

FIG. 4 schematically represents one simple type of negative spring mechanism that employs an extensible pushing or repelling force means (termed a "pusher" here), such as a coil or bent leaf spring, a gas compression spring, or a hydraulic or electromagnetic source of force F. The generic pusher 3, indicated by heavy dashed lines, has ends 1 and 2, and force F acts against each along the straight line joining them. i.e., the chord. Both said ends have moveable or pivoting end joints: pin or knife-edge ends captured by complemental V-shaped receptacles are shown in this example. In other implementations, the end pivots may be hinged joints or flexible metal linkages.

End 1 is captured by a frame member 7 and end 2 bears upon a member 4 moveable with respect to member 7 such that end 2 is constrained to move along a path 6 that has a center position 5 where the chord line of force 1-2 is perpendicular to the path line 6. Means permitting movement of member 4 along path 6 is schematically depicted by but not restricted to rollers 8, seen in end view.

At said center position 5, pusher 3 has maximum compression, i.e., the shortest length ds of its dashed-line chord 30 extending from end 1 to end 2 of the pusher at position 5. In the simplest form, the path 6 is everywhere perpendicular to the chord line 30 at its center Position.

It is implicitly assumed here that the compressive force F created within pusher3 between its end points 1 and 2 can be represented by a vector that has two force components one of which is perpendicular to path 6 at any point, and the other (of primary interest) is aligned with path 6. This component of force aligned with path 6 is the negative spring force fn. In center 5 position, that force fn along the path 6 is zero, but as end 2 moves with member 4 on path 6 up or down either way from the center 5, the chord of the pusher 3 will take the positions indicated by lines 31 or 32, and the lateral component of force fn parallel to path 6 will be developed by end 2 upon member 4, urging it farther away from center 5. In fact, if the force applied by the pusher 3 along its chord is F, and the distance away from center 5 along path 6 is d, the force fn developed along the path 6 upon member 4 is given by the relationship fn=F*sin[arctan (d/ds)]. If pusher 3 is an ordinary spring, however, the force F will drop off as its length increases beyond the minimum ds, resulting in a more complex equation although still nearly linear over a range of interest.

It may be necessary to provide end stops 33 and 34 as shown to limit the excursions of end 2 to keep the device functional at large deflections.

Considering the system of FIG. 4 as a free body diagram, as the force fn upon member or element 4 is developed, there must be an equal and opposite force fn developed upon member or element 7, and means must be provided at appropriate attachment points to apply these opposing forces against the reactive forces developed between the two loading members of an associated elastomeric bearing, i.e., said elements 4 and 7 of the negative spring mechanism must respectively be mechanically connected beneficially to said two loading members.

FIGS. 5 and 6 show details of two types of compression spring arrangements that could be used for the pusher 3 force source indicated schematically in FIG. 4. In particular, FIG. 5 uses a wire coil spring 36 that may be stabilized against columnar buckling by two encircled and opposed end parts 35, 35 that support the ID of the spring while also providing pin ends. The end parts are in turn maintained co-linear by a rod 37 telescoped within them. As in FIG. 4, the end supports 7 and 4 accept compression force F from the spring and move laterally with respect to each other, as along the path 6, thereby developing the lateral force fn along that path.

The compression spring of FIG. 6 is a buckled-columnar leaf or blade spring 3 of constant or variable width and thickness, shown in crescent-shaped edge-on view, with knife-edge ends at 1 and 2. The spring contours at locations 31a and 32a occur at the opposite maximum relative lateral extents of movement between members 7 and 4 as the bent spring extends and becomes somewhat less bowed. However, its chord length, the distance along the lines 31 or 32 between end points 1 and 2, is maintained less than its relaxed chord length, and as well known, this buckled configuration will produce a higher force F between its ends as it straightens out. This strengthening effect may tend to increase the quasi-linear range of useful compensation by force fn compared to a spring that weakens with extension.

Blade springs having flexible metal end joints were used advantageously by Dijkstra, and could be used here in place of the leaf spring with knife-edge ends as shown, whether single or doubled per Dijkstra. However, making use of end compliance to provide the necessary end rotation would introduce some amount of positive (springy) restoring effect resulting from end-flexing, thus reducing their negative rate effects.

FIG. 7 illustrates the principal of the negative spring means of FIG. 4, applied directly in conjunction with a translational elastomeric bearing 9. As noted earlier, bearing 9 is comprised of usually multiple alternate layers or laminations of metal or other strong inextensible material and rubber or elastomer (layers shown in edge view by parallel lines), to define a rectangular thick pad in this case.

Bearing 9 has the primary function to support a normal load L placed upon it by the loading member 4 while backed up by loading member 7, as said bearing is forced to move down as shown with member 4 by an external force E along lateral path 6 through a distance d. The movement along path 6 by member 4 is permitted by shear strain within the rubber laminations as cumulatively indicated by slanted dashed edge lines 10, and develops a reactive force fe that is essentially proportional to distance moved, as shown in the plots of FIGS. 1-3

Negative spring means are introduced to compensate for said reactive force of bearing 9 as loading member 4 moves along path 6, in this case by arranging for pusher means 3 to act directly upon member 4 as in FIG. 4. The rollers 8 of FIG. 4 can be replaced as a matter of convenience by the laminated bearing 9 since the bearing provides the means for lateral motion instead. However, although the forcing means 3 act in the plane of the paper in FIG. 7, the result will be the same in 3 dimensions as long as the force F acts upon member 4 in the neutral position from within a plane that includes point 1 and is normal to the path line 6 and perpendicular to the paper. In any case, the negative spring unit would share the same lateral deflection seen by said bearing, thereby developing the aiding force fn that directly counteracts or reduces the overall reactive lateral force fe, in accordance with FIGS. 1-3.

The principle of FIG. 4 can also be adapted as negative spring means to compensate directly for the reactive torque of angular rotation elastomeric bearings.

Figure 8:
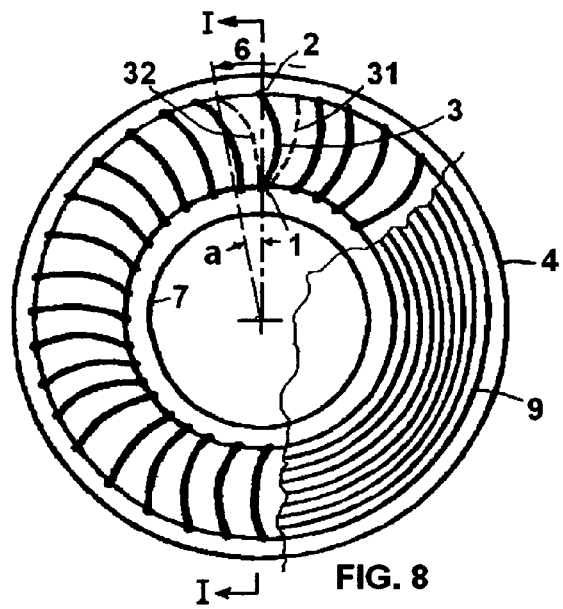
FIGS. 8 and 9 are a side view and a sectional view of a device that shows use of compressed leaf springs in a negative spring device paired with a radial-loadable elastomeric bearing according to the invention.
Figure 9:
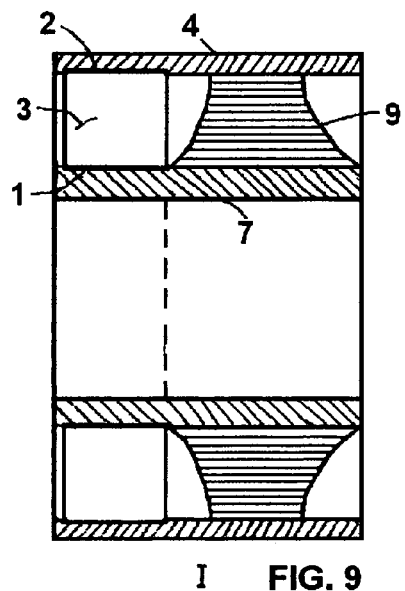

FIGS. 8 and 9 show one such approach, in which a radially-loadable laminated rubber bearing 9 is seen in cross-section in FIG. 9. Its laminations are shown there edge-on as closely spaced lines parallel to its central axis, and are seen in the right side broken-away part of FIG. 8 as concentric lines. Relative angular rotation applied between inner ring 7 and outer ring 4, i.e., the loading members, indicated by arc 6 will result in more or less proportional reactive torque to between them as seen in FIGS. 1-3.

Negative spring means are implemented via widthwise extensions of the rings 7 and 4 (not necessarily of the same diameters as shown). Said rings embrace in the extended annulus between them a multiplicity of compressed and buckled columnar-end-loaded leaf springs or other types of pushers 3, each of which has ends 1 and 2 that fit into notches in ring 7 and 4 respectively. The pushers 3 are arranged with the central positions of their chords radially-oriented within the annulus. Here, instead of the lateral path being a straight line 6 as in FIG. 4, the rings establish the curved path 6 for the motions of the ends 2 of each pusher 3. For clarity, only the top one of the pushers 3 with ends 1 and 2 is shown by dashed lines 31a and 32a to indicate angular movement of the outer ring relative to the inner ring through an angle a. As that movement occurs between said rings, a deflection-aiding torque to will develop between them as seen in FIGS. 1-3 to compensate against said reactive torque.

The instability of this arrangement is obviously similar to that of FIG. 4, and in the absence of the paralleled laminate bearing, if the inner ring 7 were fixed, the outer ring 4 would be torqued to move angularly about the central axis by the tangential components of each of the in-line forces F of the pushers 3 as their chords deviate one way or the other from their neutral radial orientations. The purposes of the invention will be achieved when the thereby-implemented negative spring rates are properly calibrated relative to the positive spring rate of the associated elastomeric bearing according to FIGS. 1-3, and the alignment or desired relative registration of their respective torque centers is realized.

Although FIG. 8 shows shallowly-bent leaf springs 3 nested together with their width dimensions more-or-less parallel to the concentric axis of rings 4 and 7, their bent shape could be S-shaped, or bent wire springs that extend the body of their curvature outwardly parallel to said axis from their radially-oriented ends 1 and 2. Close nesting of curved springs could result in efficient use of space for a large effect.

Figure 10:
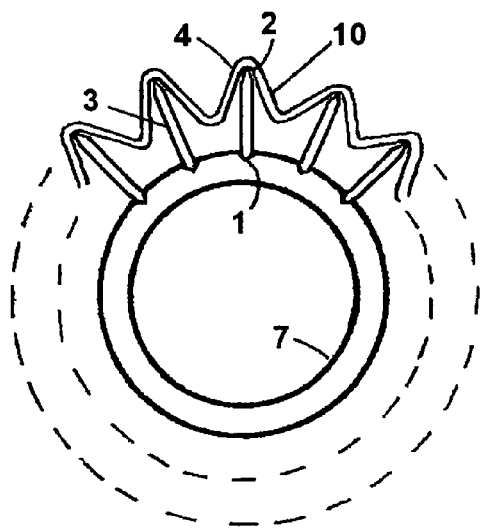
FIG. 10 shows use of an elastic compressive shell in an angular-acting negative spring device according to the invention.

FIG. 10 shows radial negative spring means using an outer ring or shell 4 that, instead of being rigid, itself has the qualities of a hoop-tension spring. It squeezes down upon and thereby creates compression forces in radially oriented pins or pegs 3 with rotatable ends 1 and 2 as pushers in place of the previously shown radial compression springs. The inner ring 7 could otherwise be an expanding hoop-spring that accomplishes the same purpose. Such hoop-tension or compression spring properties of the outer or inner rings, respectively, might be realizable through incorporation of convolutions 10 or other means of enhancing elastic qualities in the rings, including elastomeric materials, rather than metal.

The concept of FIG. 4 can be extended to other configurations of elastomeric bearings, including conical and spherical as in FIGS. 3 and 8 respectively of U.S. Pat. No. 2,900,182.

Figure 11:
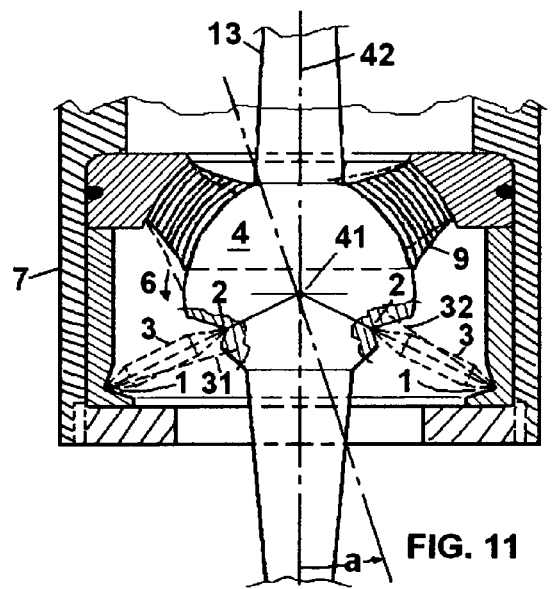
FIG. 11 shows a side cross-sectional view of negative spring means close-coupled with a spherical elastomeric bearing that is compensated by it according to the invention.

FIG. 11 shows a sectional view of such a spherical elastomeric bearing as compensated by negative spring means in the form of multiple circumferentially-spaced pushers 3 having ends 1 and 2, acting upon an associated spherical bearing 9, all contained within a supporting housing and loading member 7.

As shown in U.S. Pat. Nos. 6,524,007 and 6,834,998, FIGS. 4 an 7, in said spherical bearing each individual rubber or metal lamination or layer describes a segment of a sphere and all of these layers of different radii have a common center 41 that lies upon the longitudinal axis of symmetry 42, thereby permitting angular movement in 3 degrees of freedom about the center 41, including partial rotation of the shaft 13 about said longitudinal axis, and tilting of said axis within the plane of the paper and into or out of it. The overall configuration depicted could represent a sealed moveable shaft penetrating the hull of a submersible vehicle for control purposes in the presence of external hydrostatic pressure, where said spherical bearings are bearing-seals as previously noted.

Pusher ends 1 and 2 are each loosely anchored to and extend between receptive notches that are respectively parts of loading member 7 and the midshaft spherical loading member 4 (in broken-away sectional views). It will be seen that end 2 of any pusher is not constrained to move on a lineal path, but can move over a region. Hence this negative spring means has a range of effectiveness as a negative spring about any axis of angular movement extending through the spherical center 41, including the axis of symmetry 42 and those either in the plane of the paper or perpendicular to it, i.e., the two tilting axes. The tilt of the longitudinal axis about the point 41 through the angle a schematically indicates the latter condition, in which the surface of spherical member 4 moves through an arched trajectory 6 relative to member 7 resulting in incremental movements of the laminate edges between them as seen by dashed lines.

It is noted that pushers with their chord lines 1-2 oriented radially in the neutral unstrained orientation of the bearings need not be spaced equally around the spherical member 4 as indicated, but would have some effectiveness when arranged radially around spherical member 4 in any location. In this spherical case, the negative spring means operates as a whole about the center 41, although the variable effectiveness of any one pusher depends upon its orientation relative to any particular axis of angular movement.

Figure 12:
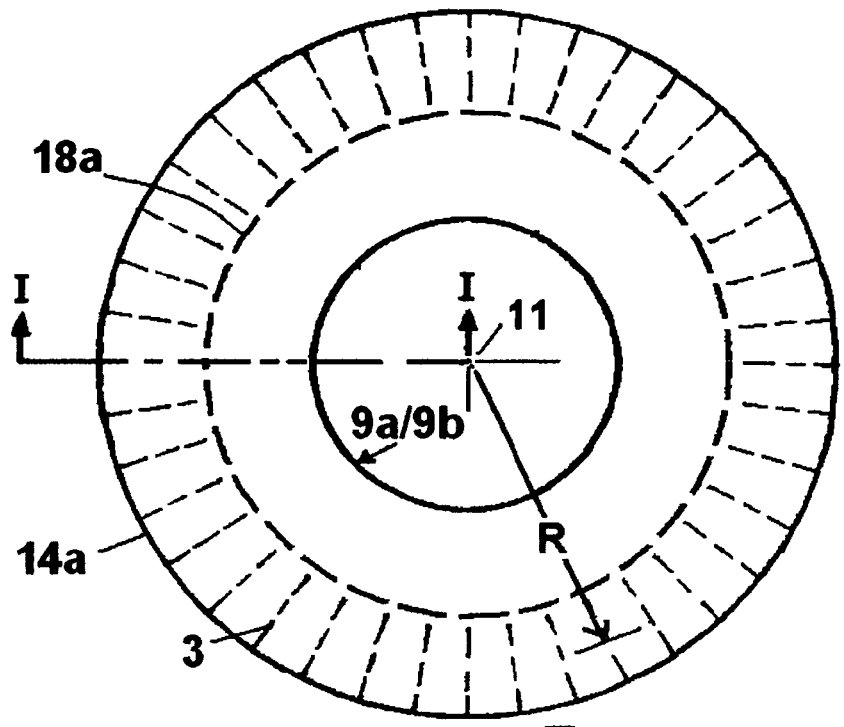
FIGS. 12 and 13 are top and partly cut-away side views of a negative spring device paired with an elastomeric thrust bearing according to the invention.
Figure 13:
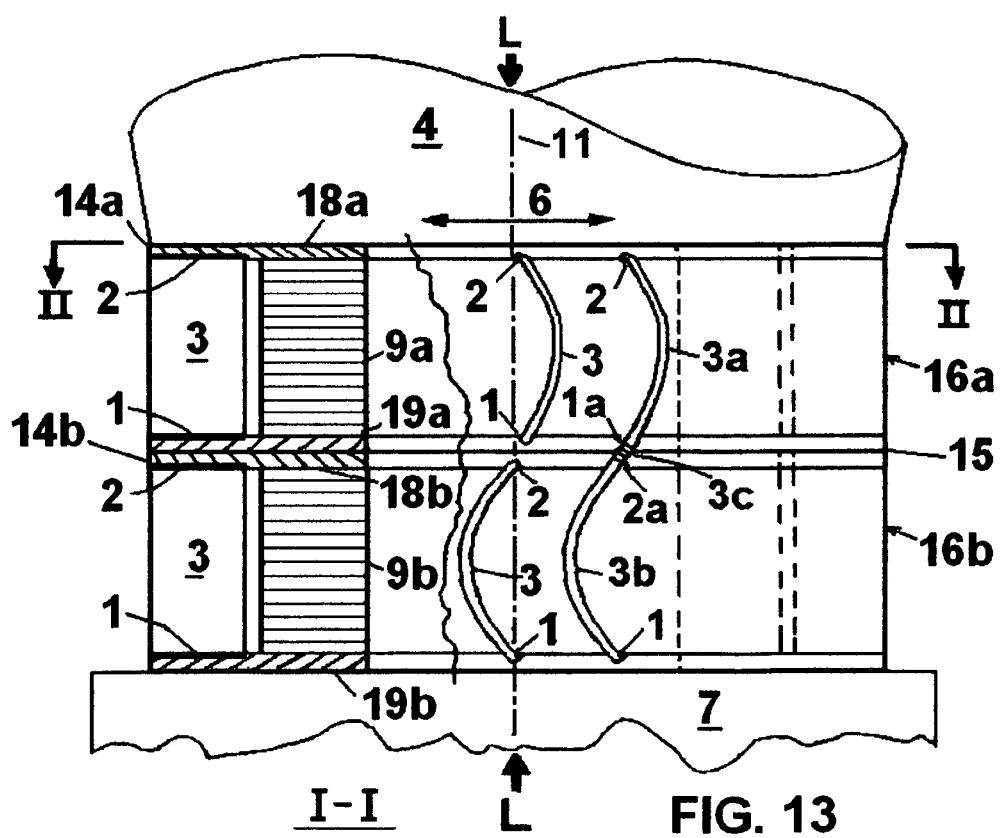

FIGS. 12 and 13 show top and partly broken-away elevation views, respectively, of a negative-spring-compensated thrust-loaded combination of elastomeric bearings. It includes an upper elastomeric bearing 9a stacked along a common axis 11 upon a lower elastomeric bearing 9b, each having a circular top end plate 18a/18b and an annularly-extended circular bottom plate 19a/19b, with bottom plate 19a affixed at median plane 15 to top plate 18b, and each said bearing having an enveloping rotational negative spring device 16a/16b that is directly paired to its associated bearing, thereby to reduce the apparent spring stiffness of said bearing.

The combined elastomeric bearings support a thrust load L emplaced by a loading member 4 (dashed lines) and transmit that load through to the base 7 (dashed lines). Limited angular movement of load member 4 indicated by the arched path 6 is shared between the combined bearings, with each of the negative spring devices 16a/16b experiencing the same angular rotation as its associated bearing.

Each negative spring device 16a/16b can be seen to be another example of the general representation of the FIG. 4 model. Each said device includes multiple bent and nested leaf springs 3, 3a and 3b, each having ends 1 or 1a and 2 or 2a as previously described, with examples seen face-on at the cut-away side of FIG. 13 and on edge near the centerline of same figure (bowed in opposite directions for reasons to be explained), and seen top edge-on as radial hidden lines in the top view. Ends 1 or 1a are loosely anchored in radially-oriented grooves or notches in the bottom plates 19a/19b, and ends 2 or 2a, are similarly anchored in notches in top annular end plates 14a and 14b respectively, with the chord lines connecting said ends of each leaf spring being near-axially oriented at the torque-neutral configuration of said negative spring device. Said annular end plates 14a/14b are concentric with, surround and experience the same angular rotation as the circular end plates 18a/18b of said elastomeric bearings, and are preferably Annular extensions of the latter end plates, but may be separated along the periphery of end plates 18a/18b though keyed together so that when load L is not applied by said loading member 4, the combined axial forces of said bent leaf springs are not transferred to the end plates 18a/18b of said elastomeric bearings 9a/9b to create undesirable tension stress in the elastomer layers. Another reason for separation of the negative spring and elastomeric bearing end plates may be a requirement for different heights of the negative spring devices and the elastomeric bearings to achieve their separate functions.

The top and bottom bearings may be considered as segments of a single bearing, but it may be found desirable to divide the overall negative spring device into more than two segments because of the limited range of angular movement of any single bearing or any single tier of said negative spring means, seen here as leaf springs.

Another possible function or side effect of the negative spring mechanism described is lateral support of the laminated elastomeric thrust bearing in similar fashion to the concepts presented in U.S. Pat. No. 3,228,673. FIGS. 9 and 10 of U.S. Pat. No. 3,228,673 indicate near-axially oriented beams that surround and span the laminate stack, being supported at their midsections by extensions of the central plate of the laminate stack and impinging along their length through rubber pads or slipper rings upon the laminate edges to support said edges.

In the current FIG. 13, the configuration of leaf springs may be engineered to provide such lateral support by acting as beams to support and prevent unstable lateral bulging of the laminated rubber bearings, thereby permitting taller individual bearings with larger angular range than possible without the negative spring means.

This purpose may be extended even further to stacked bearings as shown if pairs of leaf springs 3a and 3b above and below the median plane 15 are each effectively joined together to provide radial rigidity as of one beam, i.e., an extended leaf spring 3c, passing through radial slots at 1a and 2a in plates 19a and 14b. One way of doing so is to make each said extended leaf spring 3c wider than said radial slots except for a notched segment that that is narrow enough to pass through the slots while still maintaining the cross-beam functionality. Another way would be to form each said leaf spring pair from a single metal strip having a small through-hole provided at the point where the strip passes through said median plane, and to movably secure the strip to the median plates with a circumferentially-oriented pin passed through said hole and affixed to said median plates on each side of said hole.

Said effective beams could thereby provide support of the midsection plates at the median plane 15 against lateral movement relative to the overall top and bottom end plates 18a/19b. FIG. 13 shows the arc of the top leaf spring 3a bent tangentially in the opposite direction from thet of the bottom leaf spring 3b to better enable that rigidity. If more segments than two were added as discussed above, the leaf spring beam-functionality could be extended sinusoidally with continuous metal strips along with each such segment.

In the case of serially stacked elastomeric bearings, if the reactive torque of each were to be independently nearly perfectly compensated by the equal and opposite negative spring torques as seen in FIG. 1, then angular motion applied to such a stack may produce undesirable effects. Over-compensation by negative spring means could apparently result in "snap action" instability between a stacked bearing and its neighbors, while exact compensation may be indeterminate. Some under-compensation may be necessary to insure relatively equal sharing of the total movement applied to the stack of bearings. Realistically, minor variations in the compensated stiffness would tend to vary the individual angular movements resulting from the same torque applied to all bearings in such a stack.

Therefore, the provision of connected leaf springs as discussed may also have a very important additional beneficial effect upon that compensation problem. The lateral stiffness of the carried-through leaf springs could result in an influence between neighboring bearings that could urge them to equalize their separate angular motions.

Figure 14:
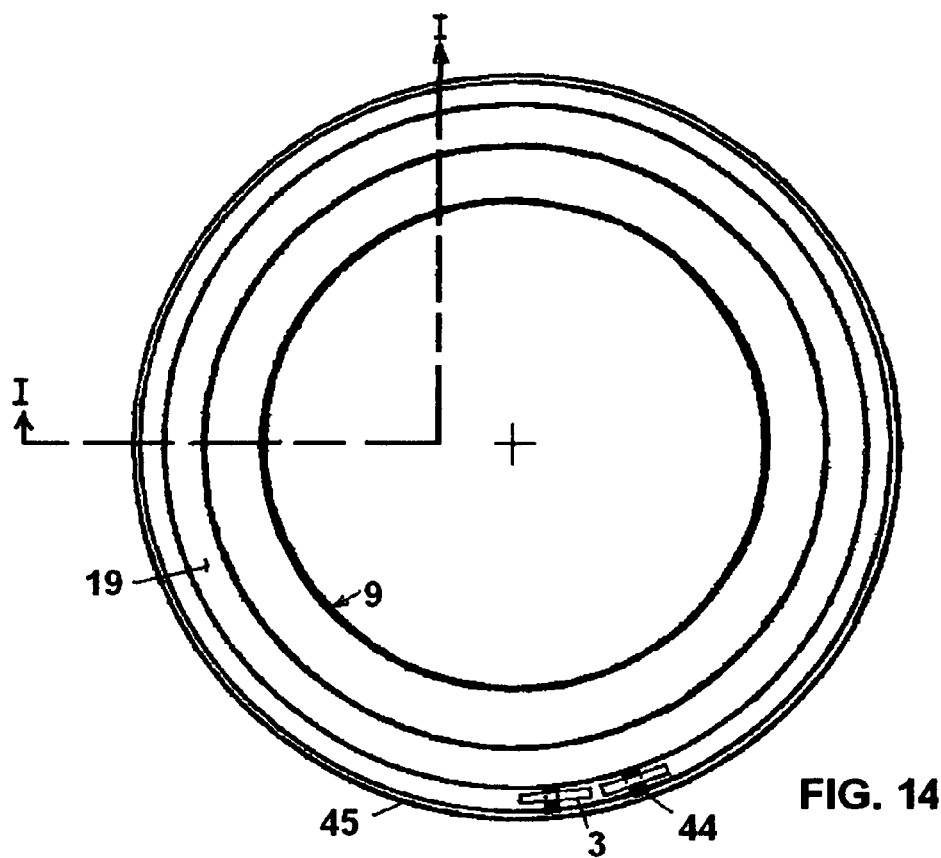
FIGS. 14 and 15 are top and partly cut-away side views of a negative spring device paired with an elastomeric thrust bearing having laminations that are segments of spheres according to the invention.
Figure 15:
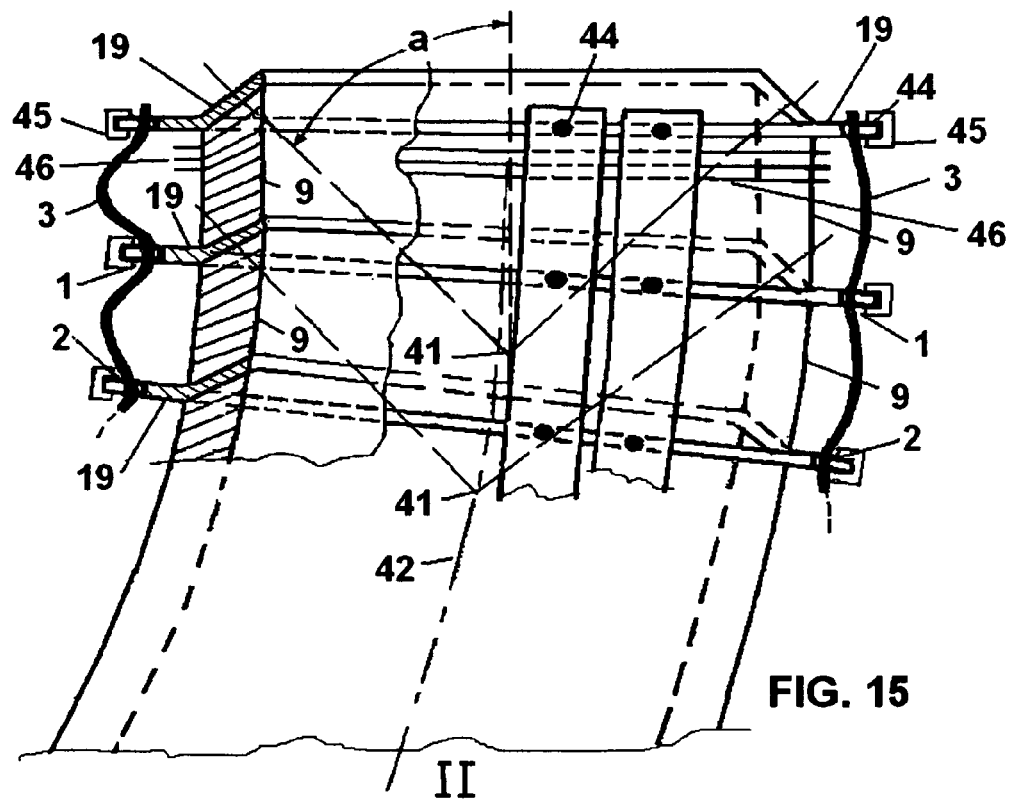

FIGS. 14 and 15 are top and partly-broken-away side views of a multipally-segmented laminated rubber bearing stack including laminate segments 9, and at intervals along said stack between said segments, radially extended thicker metal layers 19 are interposed. This device is similar to that of FIGS. 12 and 13 except that all laminate layers of metal and rubber (shown by slanted parallel lines) are not planar, but rather are truncated ring sections of spheres nested and bonded together such that each said spherical section metal ring has an associated center of revolution 41, as seen for several of the thicker layers 19. The centers of each said spherical metal ring are not shown as a single common point, but are spaced apart as are the metal layers from one another, together forming a centerline 42 as indicated in FIG. 15.

As shown in FIG. 11, each said spherical metal ring can move slightly with respect to its neighboring metal layers due to resilience of the intervening rubber layers in any of 3 dimensions about its center point, including angular rotation about the longitudinal axis or tilting about an axis within the plane of the paper and in or out of the paper plane. The gradual accumulation of such tilting of each said metal ring about its own center along the centerline of the stack amounts to a bending of the entire laminate stack as a whole, e.g., as a flexible pipe with its centerline bent into a circular arc, the radius of which depends upon the angle a as shown relative to the local centerline and the level of strain in the rubber layers. If the annulus formed between the inside and outside diameters of each ring is relatively narrow, said metal layers may be segments of a cone having a similar slope as the cross-sectional chord of the spherical-shaped rings.

Said radially extended thicker metal layers 19 are interposed to provide the supporting elements for multiple bent leaf springs 3 engaging them as was indicated for FIG. 13, except that here said bent leaf springs are shown to be formed from a continuous metal strip with its width dimension oriented tangentially. Each strip has a small hole at intervals that is penetrated by small radial pins 44 extending from the metal layers 19 that it engages in succession and all are secured by clamp rings 45.

The bent springs formed by said strips would function within individual segments as negative spring components as before, each pushing at its end points 1 and 2 against its bordering extended thicker metal layers 19. The bent strips have their bowed extents more or less sinusoidally bowed radially outward as seen here, movably linked as noted to each said extended metal layer 19 between segments along the length of the laminated structure. In this case, the bent springs are capable of providing negative spring action for the twisting degree of freedom as before, as well as for the tilting degrees of freedom, the latter being due not to the FIG. 4 model, but a consequence of the inherent negative spring property of force vs. deflection for bent columns: the column forces F increase as the chord length of a spring between successive extended metal layers increases on the outside of a bend of the laminate stack, urging for an increase in the bend and acting against the elastomeric reaction forces due to shear stress in the rubber. At the same time, the column forces F will decrease on the inside of a bend as the elastomeric reaction increases.

This device may have use as an arbitrarily elongated bearing-seal, with each end suitably mated and sealed with respect to a cooperating evacuated vessel element, in undersea or other external hydrostatic pressure applications, to permit negative-spring-compensated relative tilting or twisting movements between said cooperating elements. Said pressure would cause a compression force throughout its length acting parallel to the centerline. and would cause hoop compression forces to develop within its metal rings. Besides the radial extensions on the thicker metal rings 19, similar radial extensions 46 might be employed on the other metal rings to strengthen them, as shown for several of them.

Figure 16:
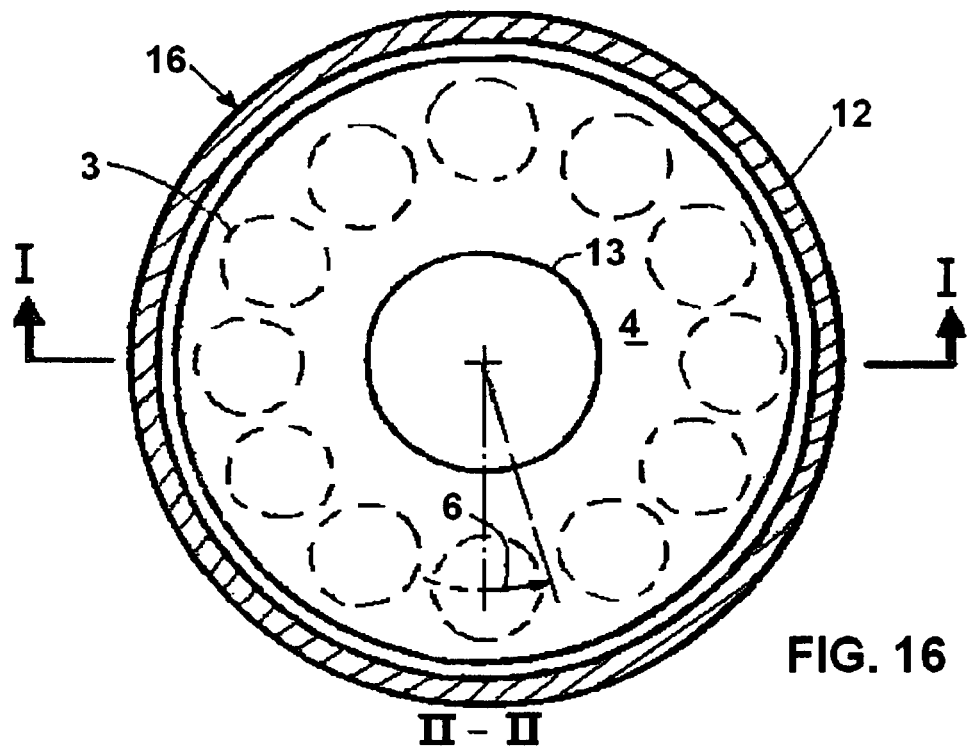
FIGS. 16 and 17 are top and side cross-sectional views respectively of another configuration of rotational negative spring device according to the invention.
Figure 17:
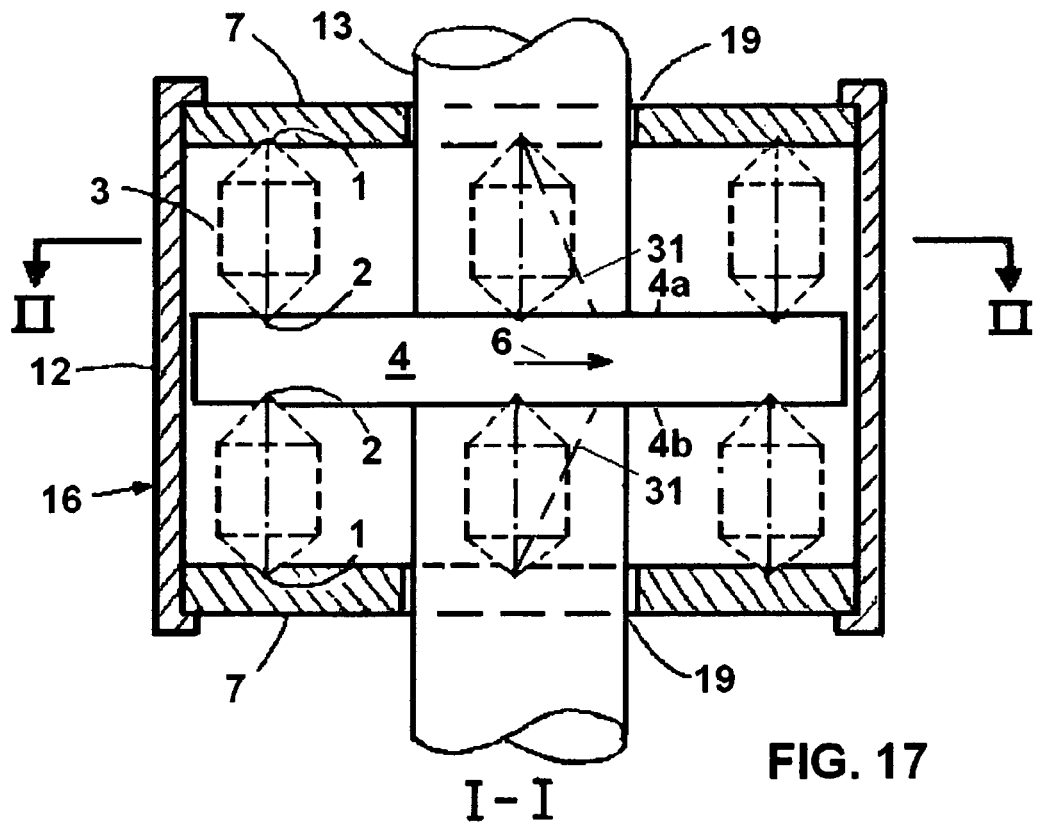

FIGS. 16 and 17 show another way to use the basic mechanism of the negative spring device of FIG. 4. These figures depict top and side cross-sectional views of a negative spring compensation device 16 having an inner shaft 13 and an outer cylinder 12. Circular end plates 7 are captured and constrained against rotation relative to cylinder 12 and are apertured to provide concentric radial bearings 19 for passage and low-friction rotational support of shaft 13. Said shaft contains a central circular flange or center plate 4 that is sandwiched between two circumferentially-spaced sets of pushers 3, totaling 12 on each side in this case. Each said pusher has ends 1 and 2 that are loosely fixed in receptacles on the inside of an end plate 7 and on flange 4 respectively. These pushers are axially oriented when the shaft 13 is in the force-centered state of angular rotation relative to the cylinder 12 and endplates 7.

It can be seen that rotation of the shaft 13 will cause the flange end 2 of each pusher 3 to move along a circular path 6, its center line or chord thereby assuming a shifted position as shown by dashed lines 31 in side view FIG. 17 (for clarity, only one said pusher 3 is so indicated on each side of flange 4). As in the simple case of FIG. 4, a component of force in the plane of flange 4 will be generated, urging further movement in the same direction. These tangential forces on both sides of the flange, acting at the radius of the circle of pushers, create an overall torque to on the shaft in the direction of displacement.

Functionally, if the shaft 13 and the cylinder 12, as application points per the FIG. 4 discussion, are respectively mechanically coupled to the opposing loading members of an elastomeric bearing and are properly calibrated in terms of matching positive and negative spring rates with their torque or force centers aligned as discussed in association with FIGS. 1, 2 and 3, the purposes of the invention will be achieved.

Another way to accomplish the same effect is to make at least one of the end plates 7 axially movable toward the other and to apply an external axial force urging them towards each other, said axial force being transferred through the pushers and flange 4. This axial force could be provided, for instance, by hydraulic or pneumatic pressure applied to end plate 7 acting as a piston in cylinder 12, or by compression springs of some type such as a large Belleville spring acting between an end of the cylinder 12 and the associated end plate 7. In this variation of the device, the pushers 3 could be equal length rigid pins or columns as in FIG. 10. Controllable axial force, as by electromagnetic or pressure means, would make it possible to vary the negative spring force in response to varying conditions of use. Using rigid pins would imply some axial motion accompanying angular movements depending upon the cosine of the angle.

Alternatively, flange 4, instead of being one solid piece, could be imbued with internal axial spring properties urging its faces 4a and 4b apart, thereby providing the same end-loading effect upon rigid pins 3. Specifically, a flange face 4a could be made compliant axially with respect to the shaft and to the other face 4b while still affixed angularly to said shaft and thus rotatable with it, and said two faces could be urged apart as pistons by pressure means or by force means such as one or more Bellville springs so as to bear upon said rigid pins, resulting in the negative spring effect of the invention.

Although there is an advantage in the configuration of FIGS. 16 and 17 in that the arrays of pushers 3 on both sides of the flange 4 can balance out the high axial forces of the pushers upon it, it is obvious that a single-sided array could also work as desired if the flange 4 were provided with a suitable thrust bearing on one side to accept the axial loading from the other side while permitting rotation of said flange.

Figure 18:
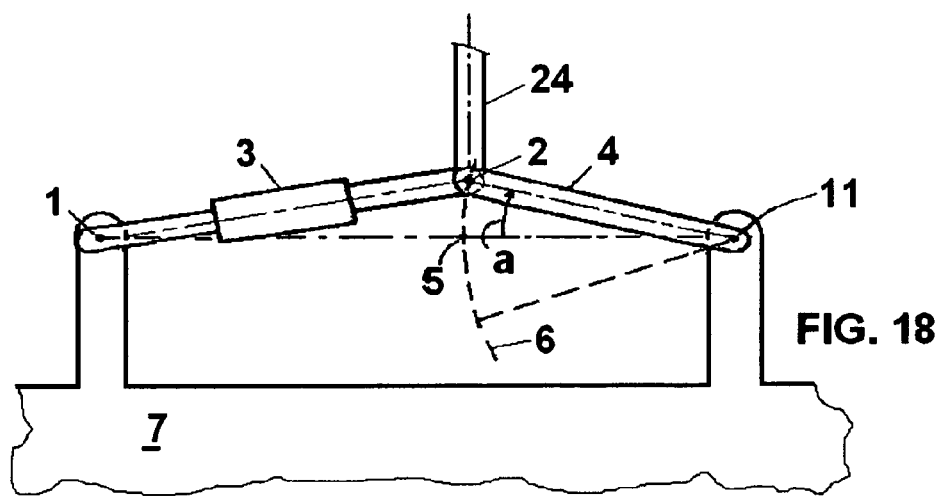
FIGS. 18 through 20 show several versions of levers plus push or pull devices that implement negative springs according to the invention.

FIG. 18 schematically shows a side view of another related model of negative spring realization, including a lever arm 4 and a force source, pusher 3. Pusher 3 has a first end point 1, and lever arm 4 has length R and a first end point 11. Both first ends are angular moveably affixed to a framework 7, while the other ends of each are jointed together at point 2. Movements of point 2 are constrained to follow a circular arc 6 about the lever arm center 11, while the length of pusher 3 varies to accommodate their connection. The point 5 along arc 6 where joint 2 is aligned with a line connecting end point 1 to end point 11 is geometrically the force center, the location where the length of pusher 3 is minimized and equal to Dm. A configuration of pusher 3 and lever arm 4 with their joint point 2 below point 5 is indicated by dashed lines.

Any deviation in either direction from the force center 5 along the path 6 will result in a component of force fn on the joint 2 urging it farther away from the force center 5. Force fn may thereupon be passed through the point 2 to an attached linkage 24 aligned roughly tangentially to path 6 at point 5. Otherwise, the tangential force acting upon the lever arm 4 could develop a torque to upon an axis perpendicular to the paper through point 11. If either said attached linkage 24 or said torqued axis through point 11, as one attachment point, and framework 7 as the second attachment point are each mechanically linked respectively to one of the movable load members of an elastomeric bearing, given the appropriate calibration in accordance with the previous discussion of FIGS. 1, 2, and 3, the purpose of the invention will be satisfied.

With a small angular deflection a (in degrees) of the lever arm away from the force center 5, and pusher force=F, the negative torque tn developed on the lever arm 4 will have the approximate magnitude $$tn=(a/57.3)*F*R/[1+(R/Dm)].$$

It is noted that similar comments may apply as well to the pusher 3; if it can function as a rigid lever itself, it can experience a component of force tangential to its rotation about its end center 1, and beneficially transfer the resulting force or torque as a negative spring device to compensate a linked elastomeric bearing. In fact, if the pusher involves an ordinary compression spring, the torque exerted upon it would be beneficially enhanced by its longer moment arm even as its force F diminishes at large excursions.

The lever arm 4 could be extended within a truncated plane in any radial direction and radius from center point 11 to an attachment point for a linkage other than point 2 (e.g., a bellcrank configuration), with said linkage aligned roughly with a tangent to said radius when force center point 5 is aligned with the line between points 1 and 11.

In a variation similar in principle to those discussed previously relative to FIG. 10 and variants of the device of FIGS. 16 and 17, the end point 1 of the pusher 3 could be made movable with respect to frame 7 and urged by a force towards point 11. This would again permit the pusher 3 to be made inextensible while still developing an increasing torque upon lever arm 4 with increasing angle, as desired.

To this point, FIG. 18 has been treated as a two-dimensional representation, but if the pusher 3 and lever arm 4 are not constrained to up/down movement in the plane of the paper, but rather are freely permitted any three-dimensional path in/out of the paper as well, a negative spring effect could be provided for a multiaxis spherical elastomeric bearing as seen in FIG. 11, said bearing's center point 41 itself serving as the current joint point 11, with said similarly free pusher jointed (as with a ball-and-socket joint) to said spherical bearing's longitudinal shaft at a point 2 in line with point 1 and point 11 of said pusher in the neutral position, thereby to reduce stiffness in said spherical bearing's tilting axes. This is, in effect, what one of the small pushers 3 in FIG. 11 does with respect to its lever arm from point 2 to center point 41.

As seen, the pusher 3 and the lever arm 4 face each other and both end points 1 and 11 and arc 6 (including point 5) are represented as being in the vertical plane of the paper. The location of the end point 1 of pusher 3 need not be in the same vertical plane as lever arm 4 and its arc 6. Indeed, in 3 dimensions, with the left-facing lever arm 4 as shown having an axis through point 11 extending perpendicular to the paper, the negative spring effect will exist with locations of the end point 1 of the pusher out of the plane of the paper and to the left of said axis. In this case, the force center point 5 on the arc 6 will be defined by the arc's intersection with a plane that contains end point 1 and said axis through point 11.

Figure 19:
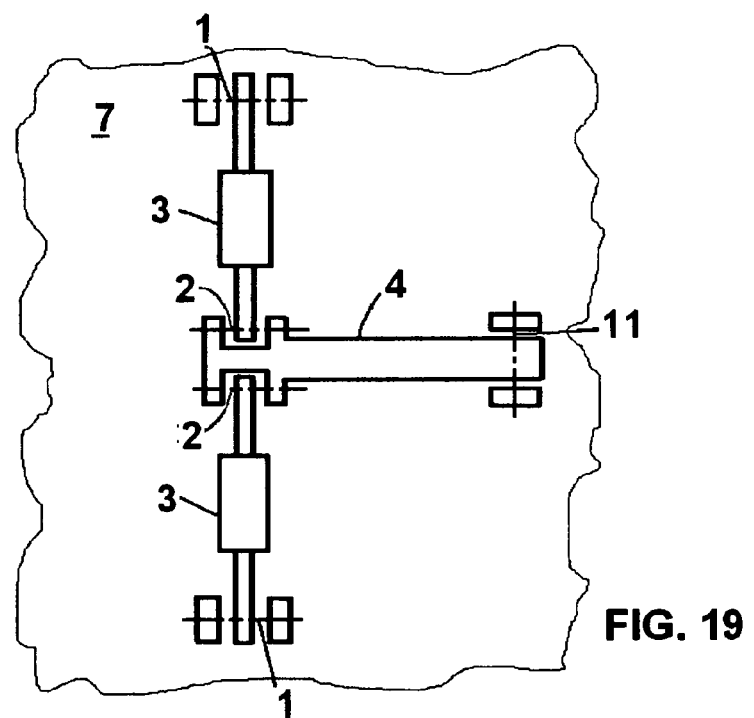

FIG. 19 shows the plan view of two pushers 3 linked to the lever arm 4, arranged on either side of the lever arm which moves on a (not illustrated) arched path within a vertical plane perpendicular to the paper. It will be obvious that equal force pushers could balance out the horizontal component of each other's force, but may need ball-and-socket end joints to follow the curvature of the lever arm's path.

It is also noted that the FIG. 19 configuration can be recognized as another mechanical model for the cylindrical negative spring device of FIGS. 16 and 17, where any pair of the pushers 3 on opposite sides of the flange 4 create a combined tangential force on the lever arm represented by their radius from the center of the shaft 13, and they are paralleled in action with all the other pairs to create the overall torque vs. deflection property of that device.

Figure 20:
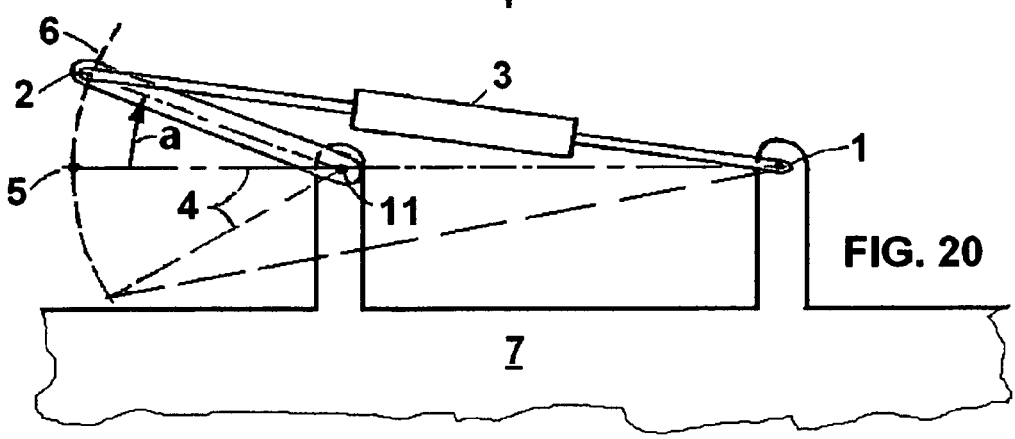

FIG. 20 shows a configuration of the same components as in FIG. 18, except that the force source 3 is a tension device pulling upon its connection to the end joint 2 of the lever arm 4, i.e., it is a "puller" such as a pull spring. This tension device 3 is arranged so that its end point 1 is on the opposite side of end point 11 of the lever arm 4 from the direction that lever arm 4 extends, so that it still creates a compressive force within the lever arm as does a pusher. Again, there is a point 5 on the arc 6 of the lever arm that is aligned with an extension of the line from end 1 to end 11, but this is geometrically the point at which the puller length is maximum, and is the force center. The position of the lever arm and tension device when their joint 2 is below point 5 is indicated by dashed lines.

As before, it can be seen that the "over-center" characteristic applies: any angular deviation a of the lever arm from the force center 5 will result in a tangential force developed on the end of the lever arm that urges further deflection in the same direction, i.e., the requirement is met for a negative spring, given that the lever arm 4 and frame 7 are functionally linked to elastomeric bearing means via attachment points as previously explained. With puller force=F, lever arm length=R and the distance between end points 1 and 11=DI, the negative torque tn developed has the approximate magnitude for small values of angle a, $$tn=(a/57.3)*F*R*[1/(1+(R/DI))].$$

A puller device would generally require a stronger force source than the pusher type to get the same results with similar dimensions, as can be deduced from examination of the two corresponding force equations.

Regarding 3-dimensional variations, similar considerations exist in this case as with pusher force sources, except that the end point 1 of the puller 3 must be on the side of the lever axis through point 11 that is opposite from the direction that lever arm 4 extends. Furthermore, analogously to the use of multiple pushers as exemplified by FIG. 19, multiple pullers having end points opposite the direction of lever arm extension from its axis 11 could be applied to the lever arm 4 to obtain the required negative spring effects.

There is a significant application of these principles for use in elastomeric bearing-equipped helicopters, as well as others that have their rotor blades retained by tension-torsion straps that also have torsional spring properties. When laminated elastomeric bearings are used for blade retention on a helicopter, they create a torsional spring effect upon the pitch control linkages as the pitch of the rotor blades is changed from an average neutral position at which the elastomeric bearings are relaxed, i.e., untorqued. With helicopters that lack a force boost system, these control forces react against and must normally be borne directly by the pilot's hands on the controls, and in some cases may result in forces that are excessive.

The pilot's controls include a collective pitch stick, which moves all of the blade angles together, through a so-called swash plate, to change the overall lift of the rotor, while in order to obtain directional control, the cyclic pitch stick causes the individual blades to be varied up and down sinusoidally through a small amplitude relative to the average pitch set by the collective system, once per revolution of the rotor. As noted, the forces reflected as a result of angular movement of said elastomeric bearings may exceed the pilot's capabilities for direct control, especially of the collective pitch stick which produces a greater range of blade pitch angle than the cyclic stick.

Many of the negative spring devices discussed herein could be used to compensate for these forces. One way to realize that compensation would be to apply a torsional negative spring device within the rotor hub itself to each individual blade's elastomeric bearing directly. That could be effective in reducing feedback forces, but would have the disadvantages of requiring rapid oscillatory motion with consequent wear of the negative spring devices, while increasing rotor hub bulk and complexity.

Rather, since the average per cycle elastic reactive forces on the collective pitch control linkage would have the same kind of force-deflection properties as those described for individual elastomeric bearings, a negative spring device could be applied within that collective control linkage, separated from but effective for the individual elastomeric bearings. Said negative spring device would create forces that act in the direction of movement of the collective stick from the neutral position, opposite to the forces reacting against said stick movement that result from reaction torques of all the elastomeric retention bearings moving simultaneously. By these means, only the feedback force of the collective part of the angular deflection of all the rotor blade retention elastomeric bearings together would be compensated when said negative spring device was properly calibrated as discussed.

Feedback forces on the cyclic pitch stick may also be reduced. These forces include blade pitch axis inertial reaction forces as well as the spring forces of the elastomeric retention bearings. Beside the possible use of force boosters, there is the possibility of reducing reaction forces by balancing the inertia and spring effects against each other, as pointed out in Canadian Patent 731007 (Ballauer, pg. 13-17). That method has to do with the oscillatory interchange of potential energy of the spring into kinetic energy of the blade's pitch angle velocity and vice-versa during each rotor rotation cycle, and is maximized in effect when the resonant frequency of the mass-spring system defined by the blade pitch-axis moment of inertia and the elastomeric spring constant plus some aerodynamic reactive torque is the same as the rotor RPM. Proper use of this technique can greatly reduce cyclic stick feedback forces.

Figure 21:
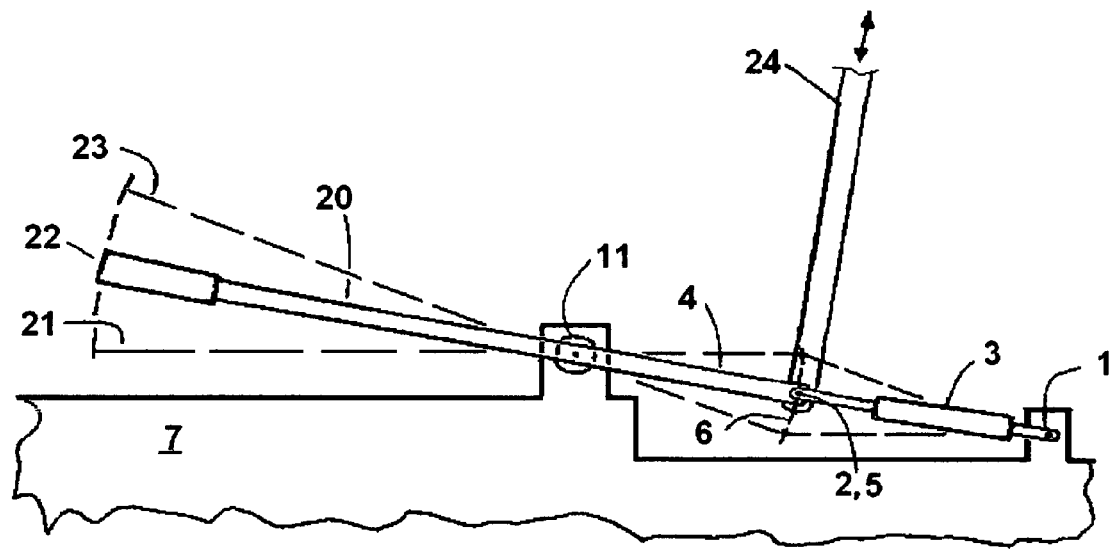
FIG. 21 shows the application of the negative spring device of FIG. 18 to the collective pitch stick of a helicopter.

FIG. 21 shows a side view of the collective pitch control stick 20 of a helicopter, pivoted at point 11 near the floor of the cabin to a frame member 7. The range of movement is from the full down position 21 to the full up position 23 (both these extremes being shown by dashed centerlines), which thereby defines the range of collective pitch of the linkage-attached rotor blades and their associated retentive elastomeric bearings. An intermediate neutral position 22 may correspond to the relaxed, untorqued angular orientation of said bearings. The collective pitch control stick may typically be extended rearward of its pivot point 11 as shown to provide the lever arm 4 which links at joint 2 through a control rod 24 to the collective pitch mechanism in order to perform its primary mission.

In compliance with the intent of this invention, the rearward extension lever 4 may be employed for force counteracting purposes as in FIG. 18. Also in accordance with FIG. 18, a compression spring or another type of pusher 3 is linked to the lever arm 4, conveniently also at joint 2, and is rotatably joined to the frame at its end point 1.

Alignment of lever arm 4 with the line between the points 1 and 11 defines the center or neutral force position of the negative spring means, corresponding to the stick's position 22 as shown. In said neutral position, the force vector of the compression spring 3 will be in line with the pivot point 11, and no torque can be exerted by the pusher 3 upon the collective pitch stick. But an upward movement of the stick handle will result in an upward force fn upon the handle from the pusher acting upon the rearward extension 4, and a downward force will result when the stick is moved downward from its neutral position. The greater the movement in either direction, the greater the force in the same direction, thereby cancelling the force fe caused by the resilient torque reaction of the combined blade pitch elastomeric bearings as reflected back to the collective stick over the effective range.

This would remove much or most of the overall force felt by the pilot, assuming that the intent was to align the negative spring force center with the elastomeric neutral point, or otherwise, as discussed with respect to FIG. 3. As pointed out there, by offsetting the force center point of the negative spring mechanism relative to the untorqued or relaxed position of the elastomeric bearings, it would be possible to create an always up or always down combined force on the stick, which might be desired to assure that hands-off operation would move the stick to the safest condition. Otherwise, such offsets or incomplete compensations may be useful in some helicopters for counteracting aerodynamic forces on the blades.

It will be obvious based on prior discussion that instead of making use of the rearward extension of the stick to provide the lever arm 4 as shown, that the negative spring assembly (including base 7, pusher 3, and lever arm 4) could be located via its pair of attachment points in any appropriate position along the linkage system between the collective pitch stick and the swash plate, given that the path 6 is sufficiently aligned with the movement of the local control linkage as it is with control rod 24.

As discussed relative to FIG. 20, another means of realizing a negative spring mechanism is to use a pull source instead of a pusher acting upon the collective stick. In a very simple example, a pull spring could be attached on one end to a point on the collective pitch stick part of the way from its pivot 11 to its handle, and on the other end to a frame point some distance behind that center pivot and in the plane perpendicular to the paper containing points 2 and 11 and the neutral point 5.

Figure 22:
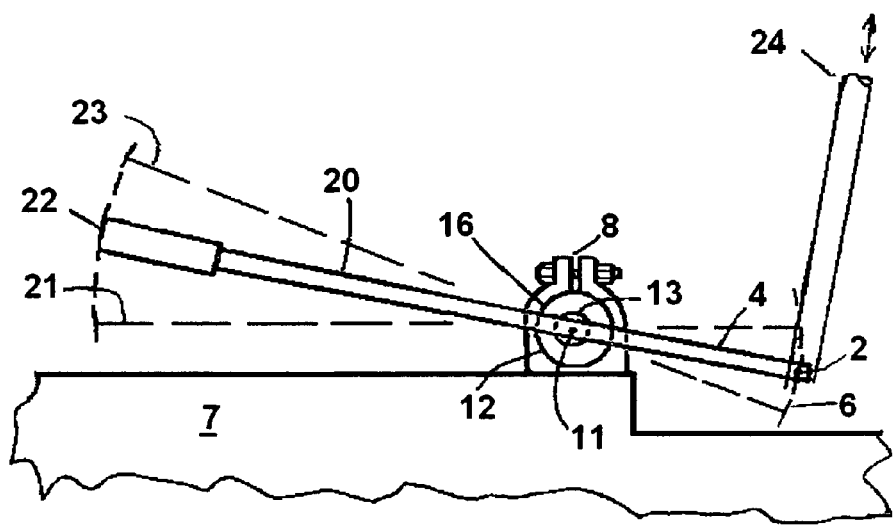
FIG. 22 indicates the attachment of the negative spring device according to FIGS. 16 and 17 to the collective pitch stick of a helicopter.

FIG. 22 indicates a collective pitch stick 20 with an attached negative spring cancellation device 16 according to FIGS. 16 and 17. The cylinder housing 12 and shaft 13 of device 16 are seen end-on in this side view. The shaft 13 is linked to or provides the axis that extends through point 11 perpendicular to the paper and is affixed to the collective stick 20 so that said shaft shares in the same or proportional angular deflections of the stick and transfers its negative torques to the stick and its extended lever arm 4. Cylinder 12 is enclosed in a circularly adjustable clamping bracket 8 that is affixed to the frame 7. Rotation of cylinder 12 within the clamp 8 before tightening permits alignment of the torque center of the negative spring device with respect to the combined elastomeric bearings through the swash plate as desired for calibration as previously discussed.

Given that the collective pitch stick experiences the reflected average spring force developed by the combined elastomeric bearings as they are moved through a part of their angular range, the negative spring rate of the cancellation device 16 is designed to match at the stick, more or less, the positive spring rate of said combined elastomeric bearings.

The foregoing description shows various instances of the pairing of negative spring devices with elastomeric bearings. "Pairing" refers to the fact that an elastomeric bearing separates two opposed relatively laterally moveable loading members that develop reactive forces or torques between them, and each of two attachment points of an associated negative spring device is mechanically connected respectively with one of said two members, such that said negative spring device moves at least partly with said elastomeric bearing or bearings to develop compensating or negating lateral forces or torques.

FIGS. 7-9 and 11-15 show instances of direct side-by-side pairing of an elastomeric thrust bearing with a negative spring device, while the remainder of the figures may be remote-coupled or partly-coupled with one or more elastomeric bearings. When directly coupled, both the elastomeric thrust bearing and the associated negative spring device generally share the same lineal or angular ranges, whereas in the remote- or part-coupled cases, the shared movements may be merely proportional or even nonlinearly related.

Upon consideration of the variety of negative spring devices considered here, it is observed that there are unifying properties of them all: They all involve linking mechanical elements, i.e., lever arms (that may be pushers as well) or pins, that experience compressive force between their opposed ends and whose ends are moveably fastened to supporting elements that are subjected to relative lateral movements. The resulting diagonality of the linking elements transfers a component of said compressive force onto their supporting elements in the direction of their relative lateral movements. The two supporting elements of the negative spring means are respectively mechanically coupled together with the two opposed loading members of at least one elastomeric bearing or seal such that movement imparted to the negative spring means is experienced, at least in part, as movement of said at least one bearing or seal whose combined positive spring rate is at least partially compensated by the negative spring rate of said negative spring devices.

It will be understood that the embodiments described above are merely exemplary and that persons skilled in the art may make many variations and modifications without departing from the spirit and scope of the invention as defined in the appended claims.

I claim:

1. A force compensation system comprising:
   at least one elastomeric or laminated rubber bearing having two opposed loading members, a positive spring rate and a center or neutral position; and
   negative spring means having a negative spring rate and a center or neutral position, comprising:
   at least one elongated member or pusher having two opposed ends, and
   a source of force imposing compressive force between said ends of each of said elongated members, and
   two receiving and supporting members that moveably support and respectively each receive force applied by one of said two ends and are constrained in lateral motion relative to each other,
   whereby a component of said compressive force will be developed upon said receiving and supporting members in a direction of said constrained lateral motion; and
   said two receiving and supporting members of said negative spring means are respectively mechanically coupled together with said two opposed loading members of said at least one elastomeric bearing such that any said relative lateral movement imparted to said receiving and supporting members of said negative spring means is experienced substantially proportionately as movement between said two opposed loading members of said at least one elastomeric bearing,
   whereby any change in net torque developed upon said elastomeric bearings accountable to their said positive spring rate is at least partially compensated by the change ii net torque developed by said negative spring rate of said negative spring means.

2. The force compensation system of claim 1 wherein said two receiving and supporting members of said negative spring means are respectively directly coupled together with said two opposed loading members of said at least one elastomeric bearing.

3. The compensation system of claim 2 wherein a multiplicity of elastomeric bearing segments are stacked to define an overall elastomeric bearing with extended layers defining the opposing loading members of each said segment, and a plurality of compression springs are arrayed such that each of their said ends bears respectively upon one of said extended layers, thereby serving as negative spring means to compensate for the positive spring rate of said bearing segment between said extended layers.

4. The force compensation system of claim 3 wherein at least one said compression spring serving a said bearing segment is functionally joined as a beam with a said compression spring serving an adjacent said bearing segment, whereby said joined beams mutually affect the extent of motion experienced by each said adjacent segment.

5. The force compensation system of claim 4 wherein said compression springs are leaf springs with their edges aligned radially with respect to an axis.

6. The force compensation system of claim 4 wherein said compression springs are leaf springs with their edges aligned circumferentially with respect to an axis.

7. The force compensation system of claim 2, wherein said elastomeric bearing has laminations that are cylindrically disposed about an axis and said negative spring means comprise a multiplicity of compression springs.

8. The force compensation system of claim 2, wherein said elastomeric bearing has laminations that are spherically disposed about a center and said negative spring means comprise a multiplicity of compression springs.

9. The force compensation system of claim 2, wherein said elastomeric bearing has laminations that each encircle a center point and said negative spring means comprise a multiplicity of compression springs.

10. The force compensation system of claim 1 wherein a said receiving and supporting member includes at least one lever arm having a point of application of force from an end of said at least one elongated member and a center point about which it is rotatable, whereby a component of tangential force is created upon said point of application.

11. The force compensation system of claim 10 wherein said receiving and supporting member includes a member rotatable through an angle about an axis and a multiplicity of said elongated members are arrayed circumferentially with their said ends bearing upon said rotatable member at radii acting as said lever arms.

12. The force compensation system of claim 1 wherein said negative spring rate is smaller in magnitude than said positive spring rate, whereby said net torque of said elastomeric bearings is under-compensated.

13. The force compensation system of claim 1 wherein said negative spring rate is larger in magnitude than said positive spring rate, whereby said net-torque of said elastomeric bearings is over-compensated.

14. The force compensation system of claim 1 wherein said negative spring rate is adjustable in magnitude.

15. The force compensation system of claim 1 wherein said center positions of said elastomeric bearings and said negative spring means do not coincide.

16. The force compensation system of claim 1 wherein said center position of said negative spring means is adjustable.

17. The force compensation system of claim 1 wherein said source of force is at least one compression spring or pusher.

18. The force compensation system of claim 1 wherein said source of force is at least one leaf spring.

19. The force compensation system of claim 1 wherein said source of force is at least one pull spring.

20. The force compensation system of claim 1 wherein said source of force is a hoop acting as a tension or compression spring that is a said receiving and supporting member and imposes compressive forces between said ends of said elongated members that are pins.

* * * * *